United States Patent
Zellak

(10) Patent No.: US 7,303,220 B2
(45) Date of Patent: Dec. 4, 2007

(54) CONNECTOR COUPLING/DECOUPLING TOOL

(75) Inventor: Darren James Zellak, Morton Grove, IL (US)

(73) Assignee: Richco Inc., Morton Grove, IL (US)

(*) Notice: Subject to any disclaimer, the term of this patent is extended or adjusted under 35 U.S.C. 154(b) by 0 days.

(21) Appl. No.: 10/673,116

(22) Filed: Sep. 29, 2003

(65) Prior Publication Data

US 2005/0067847 A1    Mar. 31, 2005

(51) Int. Cl.
*B25J 1/02* (2006.01)
(52) U.S. Cl. .......................... 294/100; 29/762
(58) Field of Classification Search ............. 294/100, 294/26.5, 34, 33, 99.1, 99.2; 29/278, 280, 29/283, 729, 762, 764; 439/748
See application file for complete search history.

(56) References Cited

U.S. PATENT DOCUMENTS

| | | | | |
|---|---|---|---|---|
| 2,549,731 A | * | 4/1951 | Wattley | 294/100 |
| 2,667,094 A | * | 1/1954 | Potter | 294/99.2 |
| 3,210,836 A | * | 10/1965 | Johanson et al. | 29/278 |
| 3,215,006 A | * | 11/1965 | Urani | 294/100 |
| 3,374,025 A | * | 3/1968 | Mantelet | 294/100 |
| 3,479,722 A | * | 11/1969 | Maness | 294/100 |
| 3,588,983 A | * | 6/1971 | Hoy | 29/764 |
| 3,699,629 A | * | 10/1972 | Hood et al. | 29/764 |
| 3,725,991 A | * | 4/1973 | Lynch | 29/764 |
| 3,739,452 A | * | 6/1973 | Gadberry | 29/254 |
| 3,903,577 A | * | 9/1975 | Phillips | 29/764 |
| 4,414,698 A | * | 11/1983 | Epstein | 294/100 |
| 4,552,039 A | * | 11/1985 | Fisher | 294/100 |
| 4,841,819 A | * | 6/1989 | Williams | 294/99.2 |
| 5,407,243 A | * | 4/1995 | Riemann | 294/100 |
| 5,954,548 A | * | 9/1999 | Stabroth | 439/839 |
| 5,956,832 A | * | 9/1999 | Reagan | 29/278 |
| 6,571,505 B1 | * | 6/2003 | Poiencot, Jr. | 294/100 |
| 6,732,426 B2 | * | 5/2004 | Adams | 29/762 |

* cited by examiner

*Primary Examiner*—Saul Rodriguez
*Assistant Examiner*—Paul T Chin
(74) *Attorney, Agent, or Firm*—Faier & Faier, PC; Martin Faier; James M. Faier

(57) ABSTRACT

A connector tool for holding a cable connector, such as a fiber optic or similar connector, for coupling and/or decoupling the connector into or from a connector port in an area having a high density of connector ports. The connector tool comprises a sleeve and a gripper, wherein the gripper has fingers that form a slot for engaging the connector. The fingers are drawn into the sleeve to form a compartment in interlocking engagement with the connector. In one embodiment, the connector tool can handle a SC fiber optic cable connector. In another embodiment, the connector tool can handle an electrical cable connector. The tool also may have a slot for receiving the cable connected to the connector. The method for holding a cable connector using the tool during coupling and decoupling of the connector into or from a connector port is also shown.

16 Claims, 3 Drawing Sheets

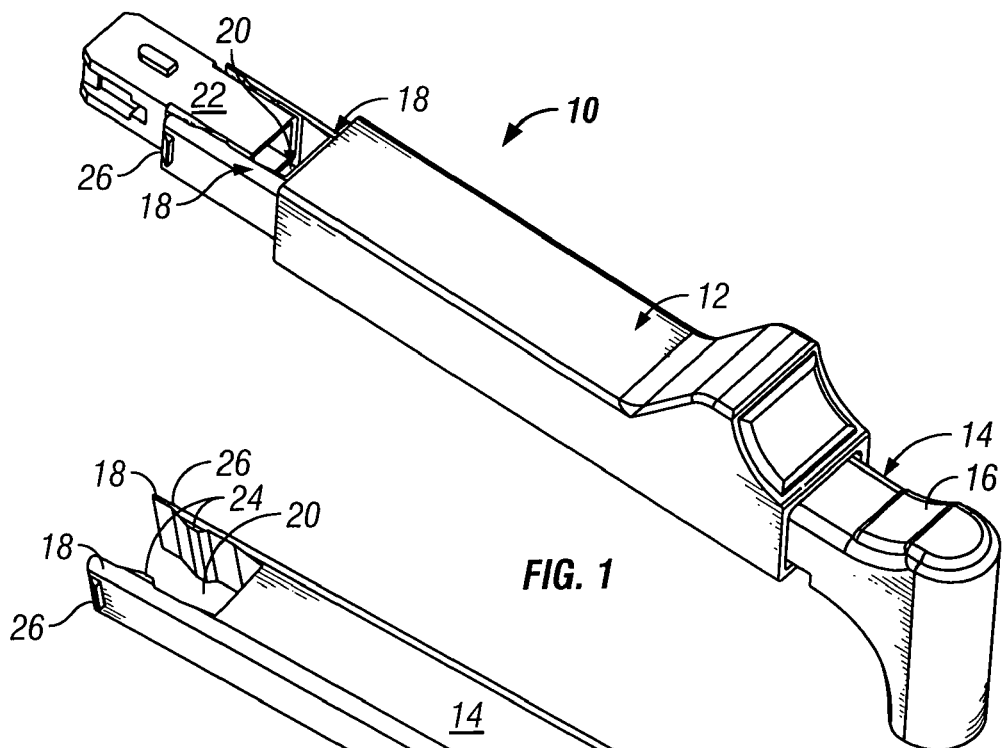
FIG. 1
FIG. 2
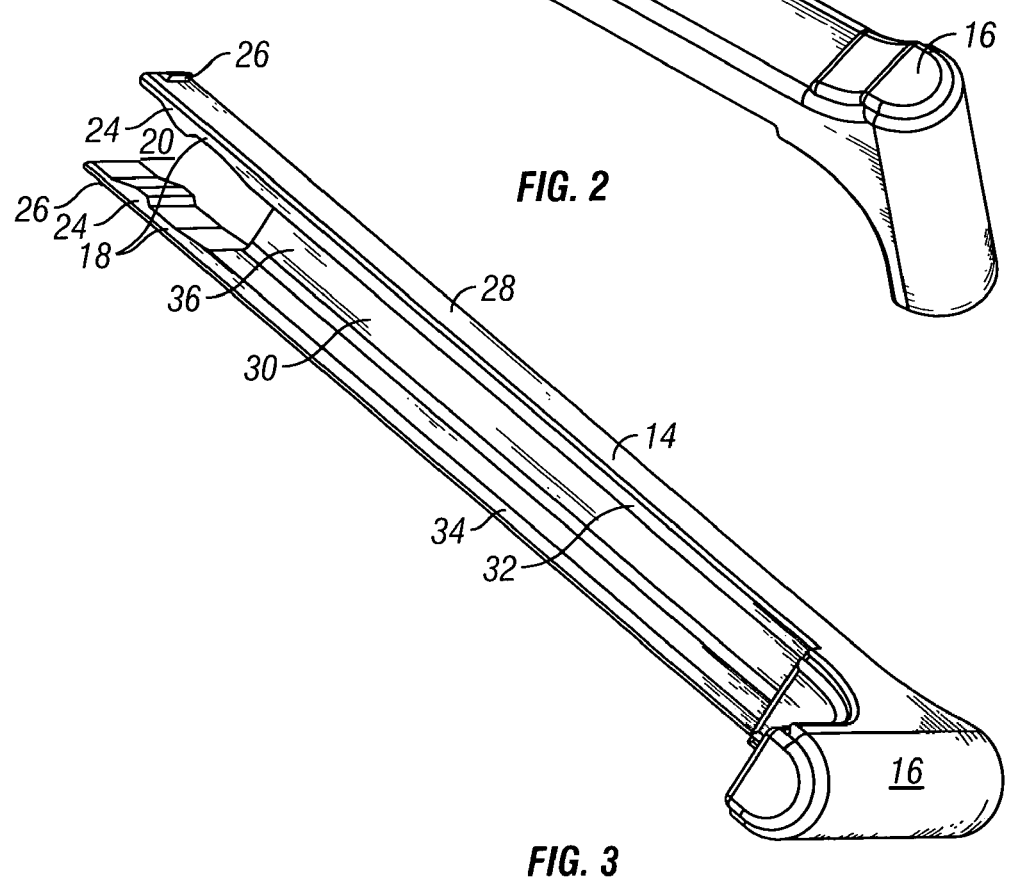
FIG. 3

CONNECTOR COUPLING/DECOUPLING TOOL

FIELD OF THE INVENTION

The present invention provides a tool for coupling or decoupling a connector from a connection port.

BACKGROUND

Currently, a large number of electronic equipment are connected to electrical, optical or other forms of signal transmission cables by quick-connect/disconnect connectors of the plug and receptacle type. However, as electronic equipment becomes smaller, more components are being squeezed into tighter spaces. Accordingly, cables that service the components are also becoming densely packed. As more cables are attached to a piece of equipment, individual cable connectors have become more difficult to insert or extract from the equipment due to the corresponding increase in the density of cable connectors. The tight space between cable connectors prevent fingers from adequately reaching a particular connector without disturbing, and possibly damaging, adjacent connectors.

Tugging at the cables is an unsatisfactory alternative to plugging or unplugging the cables by the connectors because the components within the cables can be damaged by rough handling. In addition, most modern connectors have a locking feature to prevent inadvertent decoupling. Such a mechanism is a feature of most fiber optic connectors. Examples of such connectors include screw-in, snap-in and quarter-turn type locks. Conversely, the cables are generally too flexible to serve as a adequate handle for inserting the cable connectors into the equipment. Moreover, even if the cables are stiff enough to support the connector to insert the connector into its port, such an effort may also induce stress at the junction between the cable and the connector, once again damaging the components within the cable. It would be desirable to have a hand tool that is capable of inserting and extracting cable connectors within an area having a high density of cable connectors without having to disturb the adjacent connectors.

SUMMARY OF THE INVENTION

The present invention provides a connector tool capable of holding a cable connector, for coupling and/or decoupling the connector into or from a connector port in an area having a high density of connector ports. The connector tool comprises a sleeve and a gripper, wherein the gripper has at least two fingers that form a slot for engaging the connector. The fingers are capable of being drawn into the sleeve to form a compartment in interlocking engagement with the connector. In an embodiment, the connector tool is capable of handling a SC fiber optic cable connector. In another embodiment, the connector tool is capable of handling an electrical cable connector.

BRIEF DESCRIPTION OF THE FIGURES

FIG. 1 is a perspective view of an embodiment of the connector tool according to the invention, with a connector in the connector slot.

FIG. 2 is a perspective view of an embodiment of a gripper of the connector tool according to the invention.

FIG. 3 is another perspective view of an embodiment of a gripper of the connector tool according to the invention.

DETAILED DESCRIPTION

Figure 4:
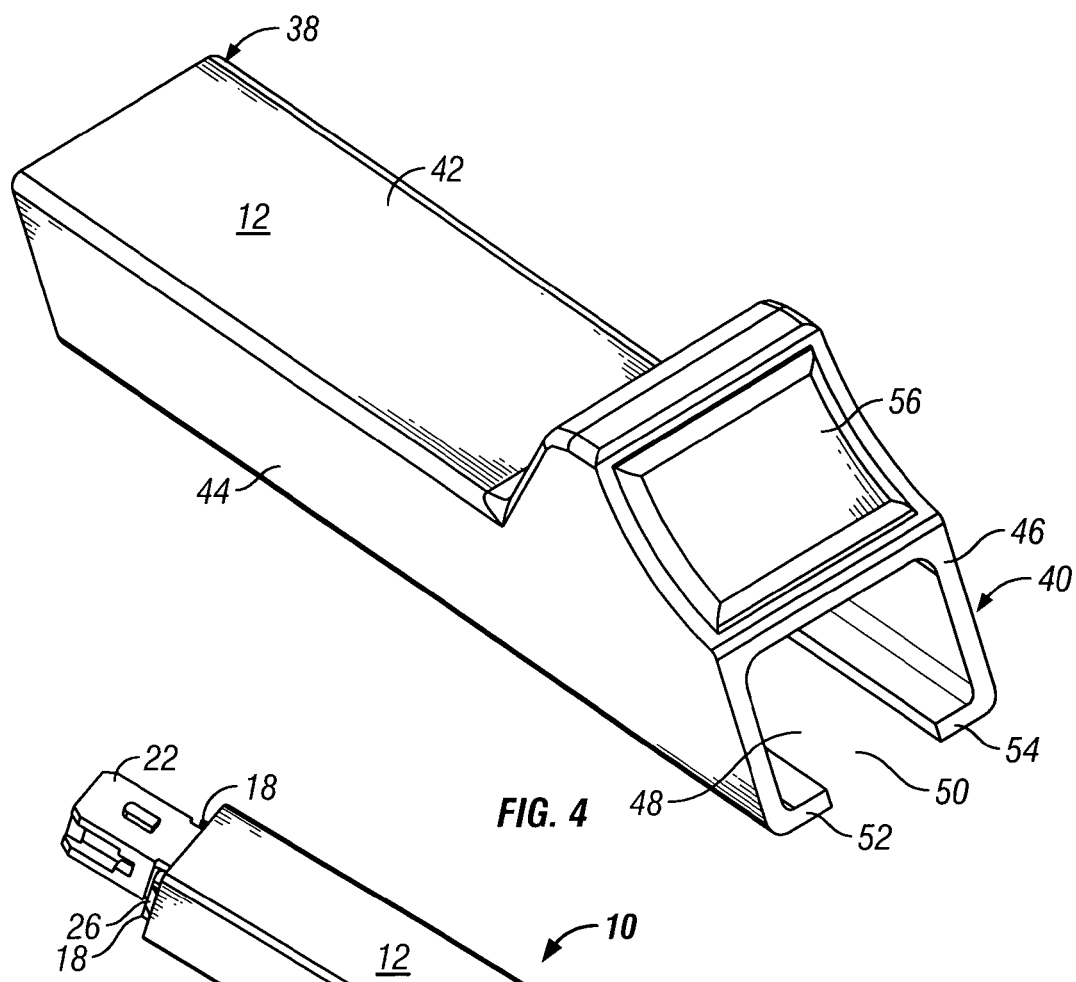
FIG. 4 is a perspective view of an embodiment of a sleeve of the connector tool according to the invention.

The invention is described by the following examples. It should be recognized that variations based on the inventive features disclosed herein are within the skill of the ordinary artisan, and that the scope of the invention should not be limited by the examples. To properly determine the scope of the invention, an interested party should consider the claims herein, and any equivalent thereof. In addition, all citations herein are incorporated by reference. In the context of this invention, substantially similar components are referenced by the same number in the different figures.

A connector coupling/decoupling tool 10 (hereinafter "connector tool") according to the present invention comprises a sleeve 12 that is capable of sliding along an elongated gripper 14. Gripper 14 has a handle 16 at one end and fingers 18 at a distal end from handle 16. As shown in FIG. 1, fingers 18 form connector slot 20 spaced to engage connector 22. An embodiment of gripper 14 is shown greater detail in FIG. 2. In this embodiment, slot 20 of gripper 14 is adapted to a substantially rectangular-shaped connector 22 as shown in FIG. 1. However, numerous cavity shapes are contemplated within the scope of the invention. Moreover, it is possible to use one cavity shape to handle a connector having a different shape, provided that fingers 18 can adequately engage the connector. In the present embodiment, gripper 14 further comprises optional engagement lugs 24 on fingers 18 within slot 20 that is capable of engaging indents in the connector, or corners of the connector. Fingers 18 also comprise optional external stops 26 to engage an end of sleeve 12.

As shown in FIG. 3, the gripper body 28 of gripper 14 comprises a top wall 30 and two side walls 32 and 34 that form a cable slot 36. Cable slot 36 accommodates the cable as the cable connector is handled by the connector tool. As shown, walls 30, 32 and 34 terminate at one end as handle 16, while side walls 32 and 34 extend beyond top wall 30 to form fingers 18. While shown as a top wall attached to two parallel side walls that are attached perpendicularly to the top wall, the invention contemplates many different embodiments to form cable slot 36. Further, cable slot 36 need not extend to handle 16. It merely needs to provide sufficient space for accommodating the cable. Examples include: a single semi-circular wall; a single sidewall perpendicularly attached to parallel top and bottom walls; a bottom wall attached to sidewalls; or a wall attached at an angle to two other walls to form various trapezoidal shapes (e.g. wide bottom or wide top).

Figure 8:
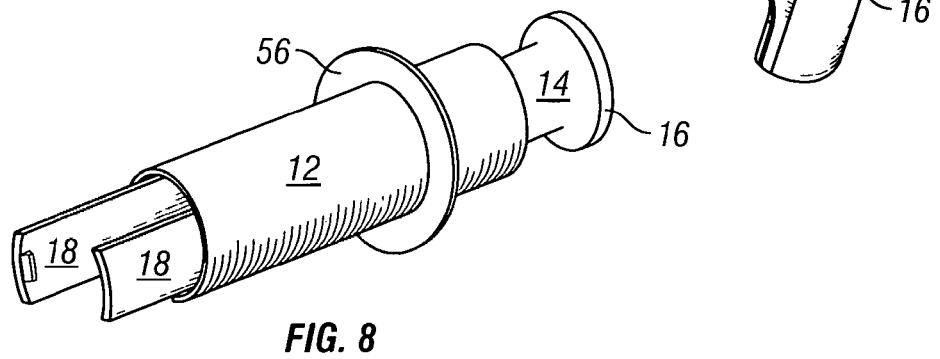
FIG. 8 is a perspective view of an embodiment of the connector tool according to the invention.

An embodiment of sleeve 12 is shown in greater detail in FIG. 4. Sleeve 12 comprises a first end 38 and a second end 40. As shown, sleeve 12 further comprises a top wall 42, two side walls 44 and 46 that forms a gripper channel 48 that extends through first end 38 and second end 40. At an end distal from top wall 42, juts 52 and 54 side protrude from the interior of walls 44 and 46, respectively, to form cable channel 50. Top wall 42 can comprise an optional finger rest 56 for use in conjunction with gripper 14. As indicated for the gripper, variations on the sleeve walls are within the scope of the invention, so long as the gripper fits within the gripper channel with sufficient tolerance that the gripper does not readily slide out of the sleeve, and the gripper fingers can cooperate with the sleeve to form a compartment that is capable of an interlocking engagement with the connector. See FIG. 8 for an embodiment having a rounded cross section. In a preferred embodiment, the cable slot of the gripper sufficiently overlaps the cable channel of the sleeve to provide sufficient space for the cable to move freely as the sleeve slides back and forth along the gripper. In another embodiment, the cable slot of the gripper overlaps the cable channel of the sleeve only to the extent necessary for the fingers to be drawn into the sleeve.

Figure 5:
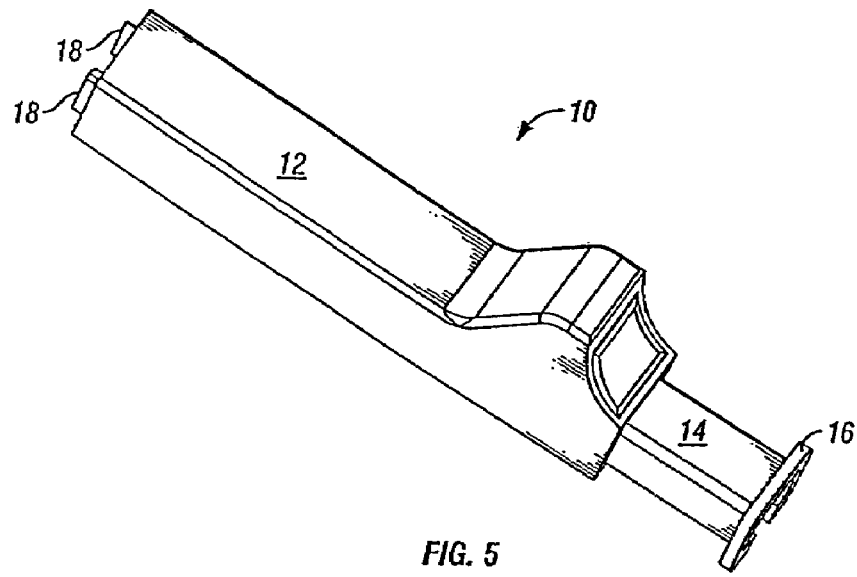
FIG. 5 is a perspective view of an embodiment of the connector tool according to the invention with the gripper fingers retracted within the sleeve.
Figure 6:
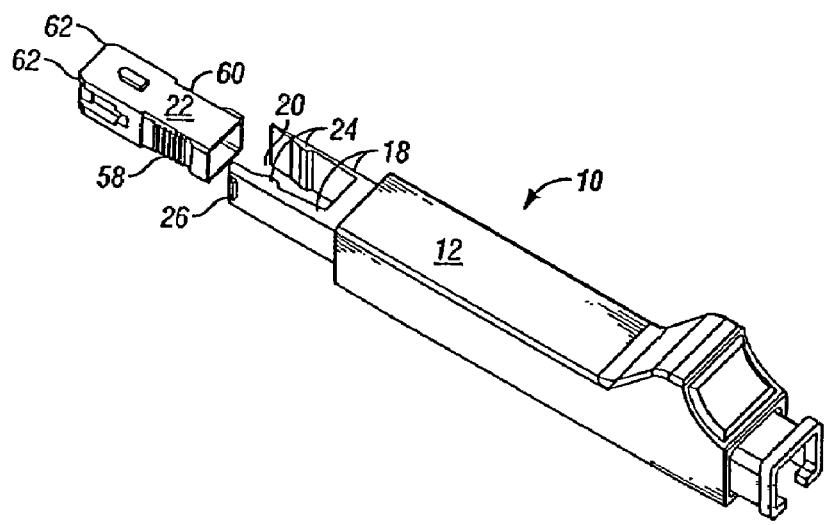
FIG. 6 is a perspective view of an embodiment of the connector tool according to the invention prior to engaging a connector into the connector slot.
Figure 9:
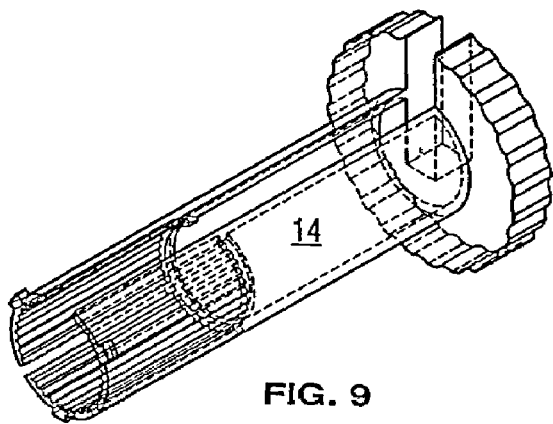
FIG. 9 is a perspective view of a transparent embodiment of an alternative gripper for use with the sleeve of the connector tool in FIG. 8.

An alternative embodiment having an alternative gripper handle 16 is shown in FIGS. 5 and 6. It should be apparent that the shape of the handle can vary. It is preferred that the handle form a backstop to prevent gripper 14 from sliding all the way through sleeve 12. A typical SC fiber optic connector housing is shown in FIG. 6. In the embodiment shown, the connector comprises indents 58 and 60 that are capable of engaging lugs 24. In the absence of such indents, engaging lugs 24 can be positioned at the tip of the fingers to engage connector 22 at corners 62 (see FIG. 8). In the absence of engaging lugs 24, fingers 18 can comprise a plurality of gripping ridges or other forms of non-slip grip in slot 20 to for frictional mating with the connector. As shown in FIG. 9, an alternative gripper for use with the sleeve shown in FIG. 8, may include gripping ridges. In this embodiment, the gripper of FIG. 9 has 3 fingers instead of 2. As shown, this embodiment is made from transparent plastic for better visualization of the connectors. An alternative embodiment of the connector tool is found in FIG. 7, having two finger rests on the side walls instead of one finger rest on the top wall.

Figure 7:
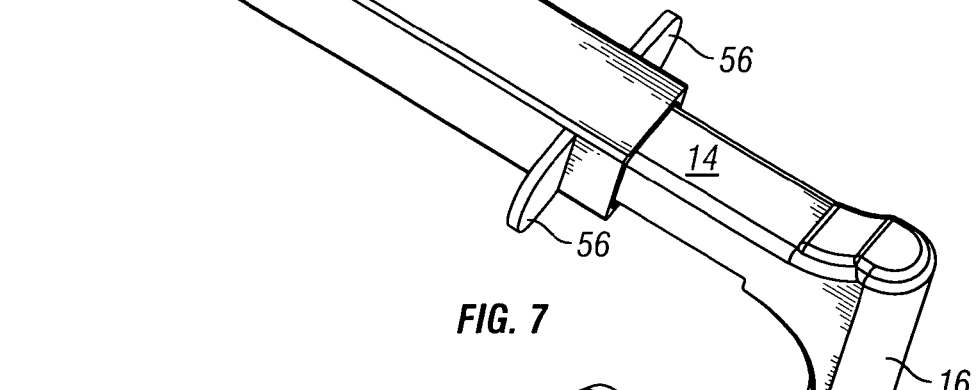
FIG. 7 is a perspective view of an embodiment of the connector tool according to the invention wherein a part of the connector is locked within the sleeve.

In operation, the gripper is slidably mounted in the sleeve. See FIGS. 1 and 5-7. In a first embodiment, the handle prevents the gripper from sliding through the sleeve from a first end. In another embodiment, external stops 26 prevents the gripper from sliding through the sleeve from a second end (FIG. 7). In another embodiment, gripper fingers flex outward so that when they are drawn into the sleeve, they apply pressure to keep the fingers compressed against the connector. In a further embodiment, gripper fingers do not flex outward, and the interlocking engagement is a consequence of the fingers and the sleeve cooperating to form a compartment sufficient to lock at least a portion of the connector within a compartment. In a further embodiment, the gripper channel tapers from a wider end at the gripper finger end to a narrower end at the gripper handle end. As the fingers are pulled into sleeve, the tapered channel gradually pinches the fingers together to further secure the connector within the slot.

Although the connector tool is made to engage connectors, the connector itself does not comprise part of the invention. Of course, an ordinary artisan would understand that the invention is not limited to use with any specific type of cable or cable connector, and can have a variety of configurations for general use with many different connectors and a variety of configurations for specific use with particular connectors. Examples of other types of cable connectors can include electrical cables connectors having substantially round cross-sections.

An example of the operation of the connector tool will begin with a cable connected to a component, wherein the cable connector of the cable is attached to a corresponding port in the component. With the gripper in the sleeve such that a handle end projects from a first end of the sleeve, and a set of gripper fingers is capable of projecting from a second end of the sleeve (FIG. 6), the assembly is manipulated so that the fingers project from the sleeve to fit the connector within the connector slot (FIG. 1). Once the connector is engaged in the slot, the gripper handle is pulled away from the sleeve, so that the gripper fingers are drawn into the sleeve on the other end (FIG. 7). In this manner, the connector is at least partially locked inside the assembly, and can be decoupled from its port by the assembly. Conversely, once a connector is locked in the assembly, the entire assembly can be moved forward to couple the connector into its port. To disengage the connector from the connector tool, the handle is pushed towards the sleeve, thereby projecting the gripper fingers beyond the end of the sleeve. Because the connector and the gripper fingers are no longer locked by the sleeve, the connector is capable of being disengaged from the gripper fingers.

When used with two hands, one hand secures the sleeve, while the other hand secures the gripper. The connector tool is also adapted for one-handed operation, in a manner similar to that of a syringe (see FIG. 7 as an example). In either case, the connector tool operates by engaging a connector in its slot, then sliding the slot into the sleeve to from an interlocking engagement between the fingers, the sleeve and the connector. Once the connector is coupled or decoupled to a connector port, the connector is disengaged from the connector tool by extending the fingers of the gripper beyond the sleeve and sliding the connector out of the slot.

The connector tool in accordance to the invention can be made from materials selected from the group consisting of plastic, metal, wood, ceramics, composites, paper board and combinations thereof. Some embodiments of the connector tool have been made from plastics. Some embodiments are made from polycarbonate. An example of a polycarbonate is LEXAN WR2210 made by General Electric.

I claim:

1. A connector tool adaptable to engage a cable connector having opposed side walls and a front wall for engaging a part, said tool comprising:
   a sleeve having a first end and a second end, and
   an elongated gripper slidably extending through said sleeve;
      said gripper comprising
      a handle at a handle end free of said sleeve, and fingers at a fingers end distal from said handle end to freely engage the side walls of said cable connector without contacting said front wall,
      wherein said gripper is slidable in said sleeve, and
      when said handle is slid to said first sleeve end, said fingers project from said second end free of said sleeve; and
      when said handle is slid away from said first sleeve end a sufficient distance for said fingers to be drawn into said second end; and said fingers lock said cable connector into said tool with a remote portion of said cable connector extending from said sleeve, said gripper having a cable slot and channel which freely slidably accommodates a cable attached to said cable connector.

2. The connector tool according to claim 1, wherein said fingers form a substantially rectangular connector slot capable of engaging a substantially rectangular connector.

3. The connector tool according to claim 1, wherein each finger comprise an engagement lug at its end and said fingers form a connector slot that engages the connector by hooking the engagement lug around a distal corner of the connector.

4. The connector tool according to claim 1, further comprising a finger rest at the said first end of the sleeve.

5. The connector tool recited in claim 1, wherein sliding movement of said gripper in said sleeve can be accomplished with one hand of its user.

6. The connector tool recited in claim 1, wherein said cable connector can be withdrawn from and inserted into said fingers only when said handle is moved to a point where said fingers project from said sleeve.

7. The connector tool recited in claim 1, wherein movement of said gripper in said sleeve is accomplished without spring action.

8. The connector tool recited in claim 1, wherein said sleeve has a finger rest adjacent said handle.

9. The connector tool recited in claim 1 wherein said cable slot extends through the first end and second end of said sleeve.

10. The connector tool recited in claim 9, wherein long juts on the walls of said sleeve define said cable slot and channel.

11. The connector tool according to claim 9, wherein said gripper has flexible fingers, such that said fingers are gradually moved together as they are drawn into said sleeve.

12. A connector tool adaptable to engage a cable connector having opposed side walls and a front wall for engaging a part, said tool comprising two pieces, consisting of:

a first piece being a sleeve having a first end and a second end, and a second piece being an elongated gripper slidably extending through said sleeve;

said gripper having a handle at a handle end free of said sleeve, and fingers at a fingers end distal from said handle end adaptable to freely engage said side walls of said cable connector without contacting said front wall, said finger each being co-planar and free of any projections at their distal ends, wherein said gripper is slidable in said sleeve, and when said handle is slid to said first sleeve end, said fingers project from said second end free of said sleeve; and when said handle is slid away from said first sleeve end a sufficient distance for said fingers to be drawn into said second end; said fingers grasp said cable connector into said tool with said front wall of said cable connector extending from said sleeve, said gripper having a cable slot and cable channel adapted to accommodate a cable a attached to said cable connector.

13. The connector tool according to claim 12, wherein each of at least two opposing fingers comprise an engaging lug in said connector slot.

14. The connector tool according to claim 13, wherein each of at least two opposing fingers comprise a non-slip grip in said connector slot.

15. The connector tool according to claim 12, that is made from plastic.

16. The connector tool according to claim 12, wherein the fingers flex outward when projected from the sleeve, and are moved inward by said sleeve as they are drawn into the said sleeve.

* * * * *